United States Patent
Sugahara

(10) Patent No.: US 8,665,522 B2
(45) Date of Patent: Mar. 4, 2014

(54) LENTICULAR SHEET AND METHOD FOR MANUFACTURING LENTICULAR SHEET

(75) Inventor: Hiroto Sugahara, Ama (JP)

(73) Assignee: Brother Kogyo Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/359,740

(22) Filed: Jan. 27, 2012

(65) Prior Publication Data

US 2012/0236416 A1 Sep. 20, 2012

(30) Foreign Application Priority Data

Mar. 17, 2011 (JP) .................... 2011-058889

(51) Int. Cl.
*G02B 27/10* (2006.01)
(52) U.S. Cl.
USPC .......................................... 359/620; 359/463
(58) Field of Classification Search
USPC .................... 359/462, 463, 619–628
See application file for complete search history.

(56) References Cited

U.S. PATENT DOCUMENTS

| | | | | |
|---|---|---|---|---|
| 4,509,823 | A * | 4/1985 | Moriguchi et al. | 359/457 |
| 6,421,181 | B1 * | 7/2002 | Yoshida et al. | 359/619 |
| 2007/0206084 | A1 * | 9/2007 | Suzuki et al. | 347/105 |
| 2007/0263296 | A1 * | 11/2007 | Suzuki et al. | 359/710 |

FOREIGN PATENT DOCUMENTS

| | | |
|---|---|---|
| JP | 9015766 | 1/1997 |
| JP | 2007-240695 | 9/2007 |

* cited by examiner

*Primary Examiner* — Darryl J Collins
*Assistant Examiner* — Gary O'Neill
(74) *Attorney, Agent, or Firm* — Frommer Lawrence & Haug LLP

(57) ABSTRACT

There is provided a lenticular sheet including: a lenticular lens having a plurality of convex lens parts arranged two-dimensionally; a first ink absorbing layer which is provided on a surface, of the lenticular lens, opposite the convex lens parts and in which ink permeates; a suppressing part provided on the first ink absorbing layer to divide the first ink absorbing layer into a plurality of regions and suppressing the ink from permeating across the plurality of regions; and a second ink absorbing layer provided to cover the suppressing part.

10 Claims, 13 Drawing Sheets

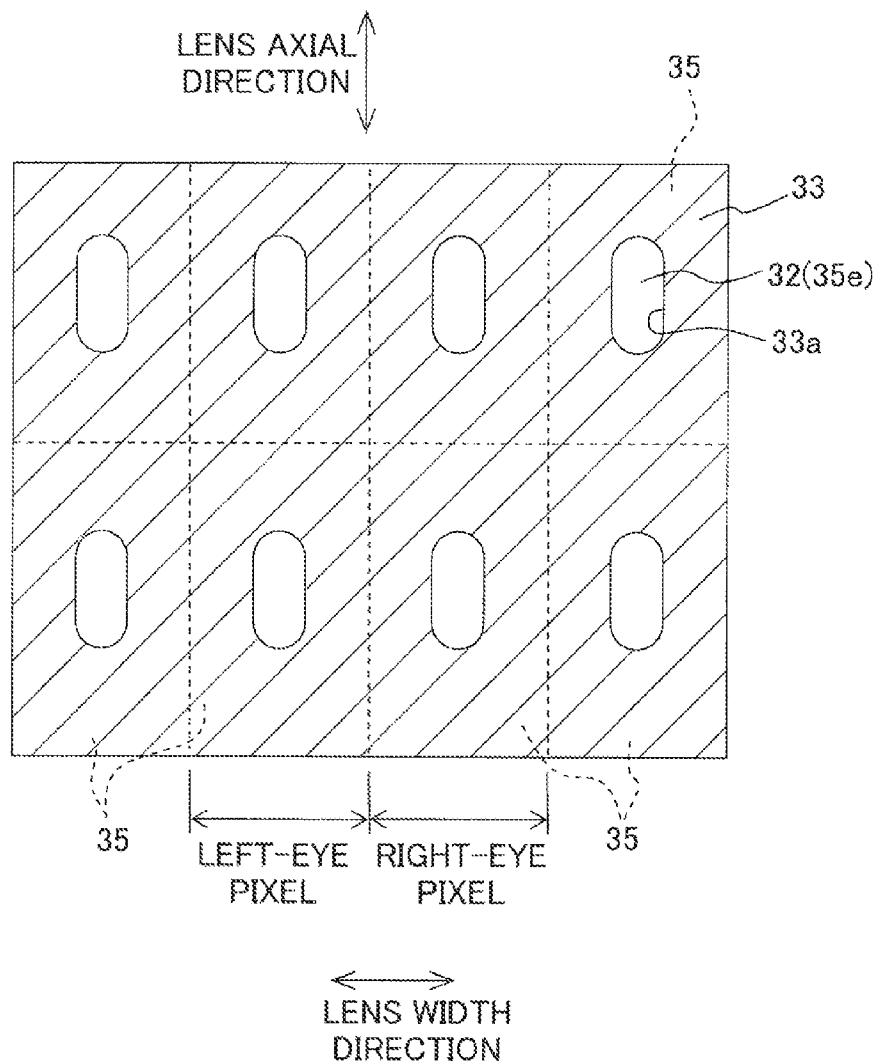

← LENS WIDTH DIRECTION →

LENS WIDTH DIRECTION

LENS WIDTH
DIRECTION

LENS WIDTH
DIRECTION

LENTICULAR SHEET AND METHOD FOR MANUFACTURING LENTICULAR SHEET

CROSS REFERENCE TO RELATED APPLICATION

The present application claims priority from Japanese Patent Application No. 2011-058889, filed on Mar. 17, 2011, the disclosure of which is incorporated herein by reference in its entirety.

BACKGROUND OF THE INVENTION

1. Field of the Invention

The present invention relates to a lenticular sheet enabling stereoscopic vision of an image and a method of manufacturing the same.

2. Description of the Related Art

As a recording medium enabling stereoscopic vision of an image, a lenticular sheet has been conventionally known. An ordinary lenticular sheet has: a lenticular lens having a plurality of convex lenses in a semi-columnar shape that are arranged two-dimensionally; and an image recording layer which is provided on a flat surface, of the lenticular lens, opposite the convex lenses and on which a plurality of pixels are formed. On the image recording layer, left-eye pixels and right-eye pixels are adjacently formed. When a person sees the lenticular sheet from the convex lens side of the lenticular lens, the left eye visually perceives the left-eye pixels and the right eye visually perceives the right-eye pixels owing to the convex lenses, so that stereoscopic vision of an image is made possible due to disparity between images seen by the left eye and the right eye respectively (binocular parallax).

There are various methods of image recording on the image recording layer of the above-described lenticular sheet, and as one of them, a recording method by an ink-jet recording apparatus is known. In this case, the image recording layer of the lenticular sheet is made of a material high in ink absorbency (ink absorbing layer).

When an image is recorded on the image recording layer made of the ink absorbing layer by the ink-jet recording apparatus, if a landing position of droplets deviates from a proper position, ink sometimes permeates not only in a region where a desired pixel is disposed but also in a region where an adjacent pixel is disposed. Especially when the above problem occurs between the left-eye pixel and the right-eye pixel in the lenticular sheet, it might not be possible to produce binocular parallax for realizing a stereoscopic image.

Regarding this, in a lenticular sheet of Japanese Patent Application Laid-open No. H09-15766, in order to prevent ink from running to/from adjacent pixels, sheet ribs or water repellent regions not allowing the permeation of the ink are provided on the ink absorbing layer for respective pixels, being arranged at a predetermined pitch in a direction (width direction) perpendicular to a longitudinal direction of semi-columnar convex lens parts (for example, FIG. 4 and FIG. 5 of Japanese Patent Application Laid-open No. H09-15766).

In the above-described lenticular sheet, the sheet ribs or the water repellent regions preventing the ink from running to/from the pixels are exposed on a surface of the lenticular sheet. At the time of image recording, when droplets of the ink jetted from an ink-jet recording apparatus to the ink absorbing layer partly adhere to the aforesaid sheet ribs or water repellent regions, the ink is likely to remain without being absorbed. Accordingly, after the image recording, the ink remaining on exposed surfaces of the sheet ribs or the water repellent regions might contaminate the vicinity (hands of a user, the inside of the recording apparatus, and so on).

SUMMARY OF THE INVENTION

It is an object of the present teaching to provide a lenticular sheet capable of suppressing the permeation of ink to/from adjacent pixels by being provided with a suppressing part between a plurality of pixel arrangement regions of an ink absorbing layer and is capable of preventing the ink remaining on a surface of the suppressing part from contaminating the vicinity.

According to a first aspect of the present teaching, there is provided a lenticular sheet including:

a lenticular lens having a plurality of convex lens parts arranged two-dimensionally;

a first ink absorbing layer which is provided on a surface, of the lenticular lens, opposite the convex lens parts and in which ink permeates;

a suppressing part provided on the first ink absorbing layer to divide the first ink absorbing layer into a plurality of regions and suppressing the ink from permeating across the plurality of the regions; and a second ink absorbing layer provided to cover the suppressing part.

According to the present teaching, since the suppressing part suppressing the permeation of the ink is provided on the first ink absorbing layer to thereby divide the first ink absorbing layer into the plural regions, the ink permeating in one of the regions is prevented from permeating up to an adjacent region. Further, if the suppressing part is exposed from the ink absorbing layer, the ink remaining on a surface of the suppressing part might contaminate the vicinity thereof (hands of a user, a recording apparatus, and the like), but in the present teaching, owing to the second ink absorbing layer provided to cover the suppressing part, the above problem does not occur.

According to a second aspect of the present teaching, there is provided a method for manufacturing a lenticular sheet, the method including:

preparing a lenticular lens having a plurality of convex lens parts arranged two-dimensionally;

stacking a first ink absorbing layer on a surface, of the lenticular lens, opposite the convex lens parts;

disposing, on the first ink absorbing layer, a suppressing part suppressing the permeation of ink, to divide the first ink absorbing layer into a plurality of regions; and stacking a second ink absorbing layer on a surface opposite the lenticular lens, of the first ink absorbing layer on which the suppressing part is formed.

Since the second ink absorbing layer is thus provided to cover the suppressing part after the suppressing part is formed to divide the first ink absorbing layer into the plural regions, a surface of the suppressing part not easily absorbing the ink is not exposed, so that the ink does not remain on the surface of the lenticular sheet.

BRIEF DESCRIPTION OF THE DRAWINGS

FIG. 5 is a plane view of a first ink absorbing layer on which a suppressing part is formed, in the lenticular sheet;

DETAILED DESCRIPTION OF THE PREFERRED EMBODIMENTS

Figure 1:
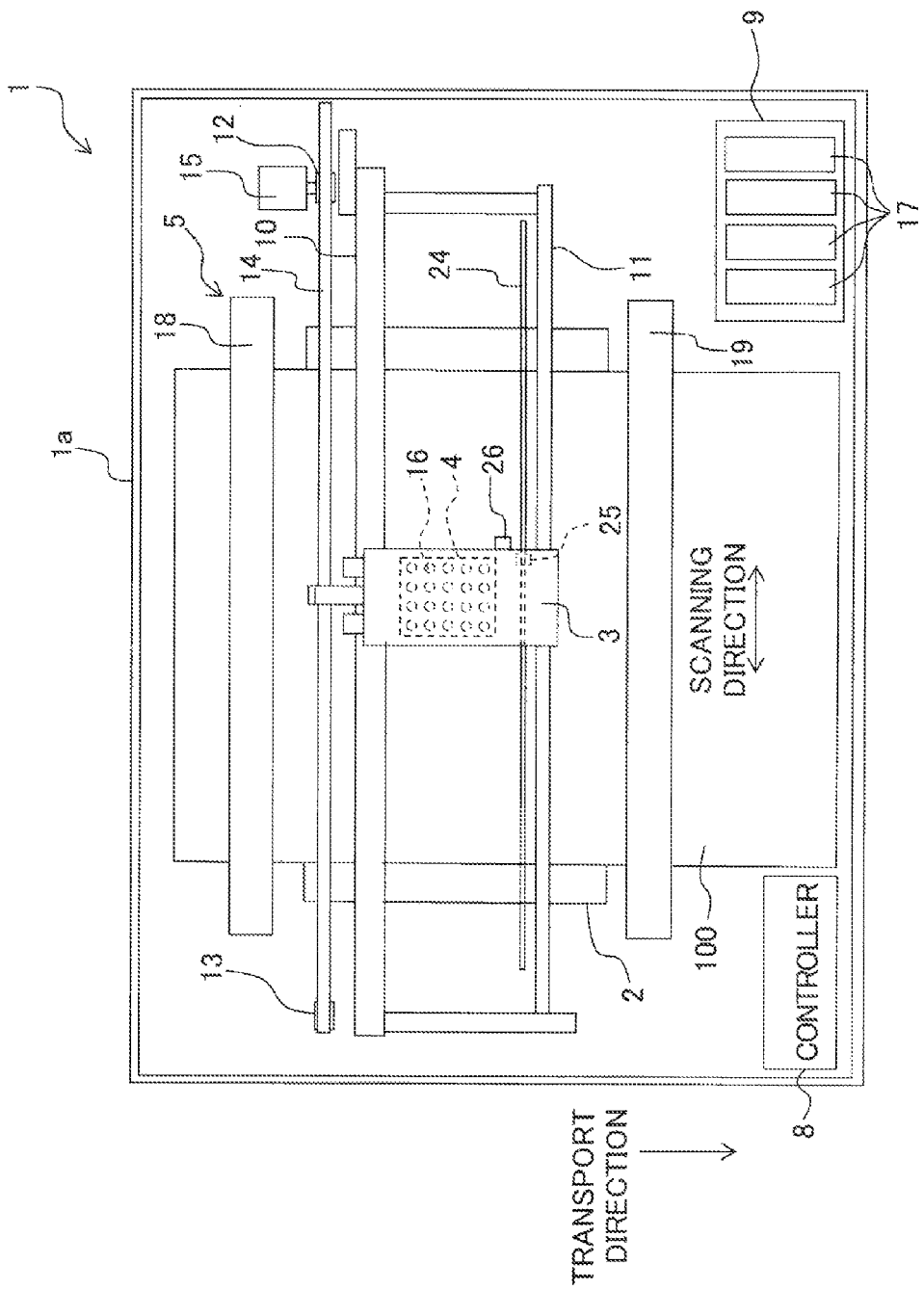
FIG. 1 is a schematic plane view of an ink-jet printer according to this embodiment.

Next, an embodiment of the present teaching will be explained. First, a schematic structure of an ink-jet printer 1 recording a stereoscopic image on a lenticular sheet of the present teaching and a method for forming an image on the lenticular sheet will be explained. As shown in FIG. 1, the ink-jet printer 1 includes: a platen 2 on which the lenticular sheet 100 is placed; a carriage 3 reciprocatable in a scanning direction parallel to the platen 2; an ink-jet head 4 mounted on the carriage 3; a transporting mechanism 5 transporting the lenticular sheet 100 in a transport direction perpendicular to the scanning direction; a controller 8 controlling the entire ink-jet printer 1; and so on.

On an upper surface of the platen 2, the lenticular sheet 100 (see FIG. 2) being a recording medium is placed, with its surface opposite convex lens parts 31 of a lenticular lens 30 being set on an upper side. Above the platen 2, two guide rails 10, 11 extending in parallel to a left and right direction in FIG. 1 (scanning direction) are provided, and the carriage 3 is reciprocatable in the scanning direction along the two guide rails 10, 11 in a zone facing the platen 2. Further, an endless belt 14 wound between two pulleys 12, 13 is coupled to the carriage 3, and when the endless belt 14 is driven to run by a carriage driving motor 15, the carriage 3 moves in the scanning direction as the endless belt 14 runs.

In a printer body 1a of the printer 1, a linear encoder 24 having a large number of light-transmitting parts (slits) arranged at intervals in the scanning direction is provided. On the carriage 3, a head position detection sensor 25 including a transmissive sensor having a light-emitting element and a light-receiving element is provided. The printer 1 is capable of recognizing a current position of the carriage 3 in terms of the scanning direction from a count value of the light-transmitting parts of the linear encoder 24 detected by the head position detection sensor 25 (the number of times they are detected) during the movement of the carriage 3.

Further, on a sidewall of the carriage 3, a pixel position detection sensor 26 for detecting information (position and pitch) regarding a plurality of regions (to be described later), of the lenticular sheet 100, on which pixels are formed (pixel arrangement regions 35) is also provided. In more detail, the pixel position detection sensor 26 has a light-emitting element emitting light to the lenticular sheet 100 and a light-receiving element receiving reflected light, and detects a plurality of colored parts (suppressing part 33: see FIG. 4) arranged in a width direction of the lenticular sheet 100 at an equal pitch.

The ink-jet head 4 is installed on an underside of the carriage 3 to be parallel to the upper surface of the platen 2, and a lower surface (a surface on a side across the paper in FIG. 1) of the ink-jet head 4 is a droplet jetting surface in which a plurality of nozzles 16 are opened. Further, as shown in FIG. 1, a holder 9 is fixedly provided on the printer body 1a of the printer 1, and four ink cartridges 17 storing four color inks (black, yellow, cyan, magenta) respectively are installed in the holder 9. Further, the ink-jet head 4 mounted on the carriage 3 and the holder 9 are connected by four tubes (not shown), and the inks in the four ink cartridges 17 are supplied to the ink-jet head 4 via the four tubes respectively.

The ink-jet head 4 includes an actuator (not shown) applying pressures to the inks in the nozzles 16 to cause the nozzles 16 to jet droplets of the inks independently. The structure of the actuator is not limited to a specific one, and generally known one such as a piezoelectric actuator utilizing piezoelectric distortion of a piezoelectric element is usable. The ink-jet head 4 uses the actuator to make each of the nozzles 16 jet the corresponding color ink to the lenticular sheet 100 placed on the platen 2.

The transporting mechanism 5 has two transporting rollers 18, 19 arranged to sandwich the platen 2 in the transport direction, and the lenticular sheet 100 placed on the platen 2 is transported in the transport direction (near side in FIG. 1) by the two transporting rollers 18, 19.

The ink-jet printer 1 jets the inks from the ink-jet head 4 reciprocating in the scanning direction (the left and right direction in FIG. 1) with the carriage 3, to the lenticular sheet 100 placed on the platen 2, and transports the lenticular sheet 100 in the transport direction (near side in FIG. 1) by the two transporting rollers 18, 19. Consequently, droplets of the inks are landed on a surface, of the lenticular sheet 100, opposite the lenticular lens 30, whereby an image is printed on the lenticular sheet 100.

Figure 2:
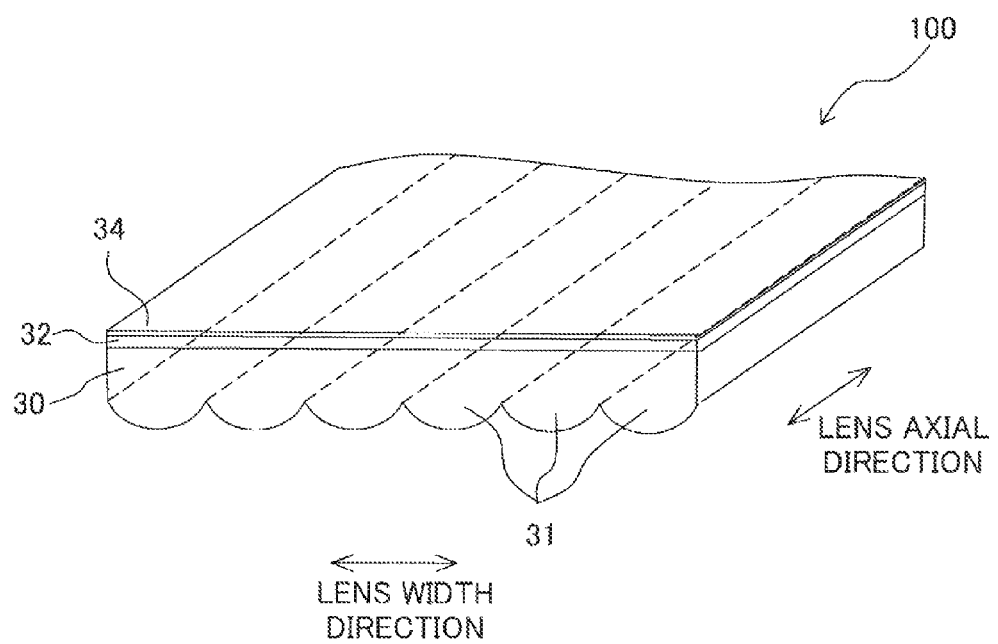
FIG. 2 is a perspective view of a lenticular sheet.

Next, the lenticular sheet 100 will be explained. As shown in FIG. 2, the lenticular sheet 100 has: the lenticular lens 30 having the plural convex lens parts 31 having a semi-columnar shape and arranged in their width direction two-dimensionally; and a first ink absorbing layer 32 disposed on a flat surface 30a, of the lenticular lens 30, opposite the convex lens parts 31.

The first ink absorbing layer 32 is a colorless and transparent layer or a white layer excellent in ink absorbency. The first ink absorbing layer 32 may be a resin layer excellent in ink absorbency containing a swelling material such as a water-absorbing polymer or a porous material such as porous silica, but may be a paper sheet (recording sheet) used for ordinary image recording.

The first ink absorbing layer 32 is divided into a plurality of regions by the suppressing part 33 as will be described later. In this specification, the regions demarcated by the suppressing part 33 are called pixel arrangement regions 35 for convenience sake. An ink droplet corresponding to one dot may be jetted from the ink-jet printer 1 to each of the pixel arrangement regions 35, but this is not restrictive, and a plurality of dots may be formed on the single pixel arrangement region. As shown in FIG. 3, in a region, of the ink absorbing layer 32, facing the single convex lens part 31, a left-eye pixel and a right-eye pixel which are slightly different to produce a binocular parallax operation are arranged in the width direction of the convex lens parts 31 in the semi-columnar shape (hereinafter, referred to as a lens width direction). Incidentally, as shown in FIG. 5 which will be explained later, the left-eye pixels and the right-eye pixels are both arranged in rows in an axial direction of the convex lens parts 31 (hereinafter, referred to as a lens axial direction) perpendicular to the paper in FIG. 3.

Figure 3A:
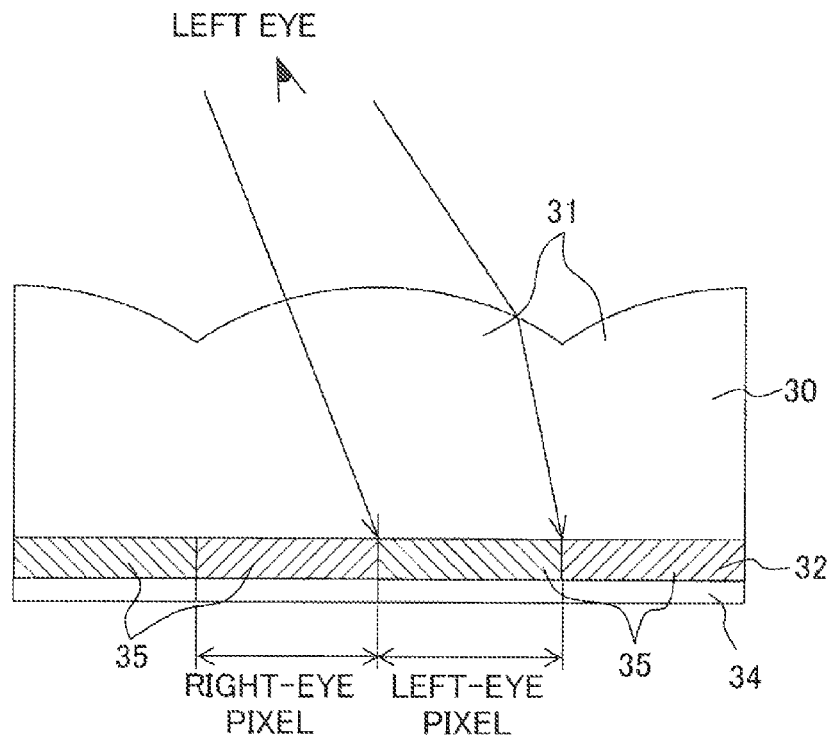
FIGS. 3A and 3B are views used to explain a stereoscopic visual effect by the lenticular sheet.
Figure 3B:
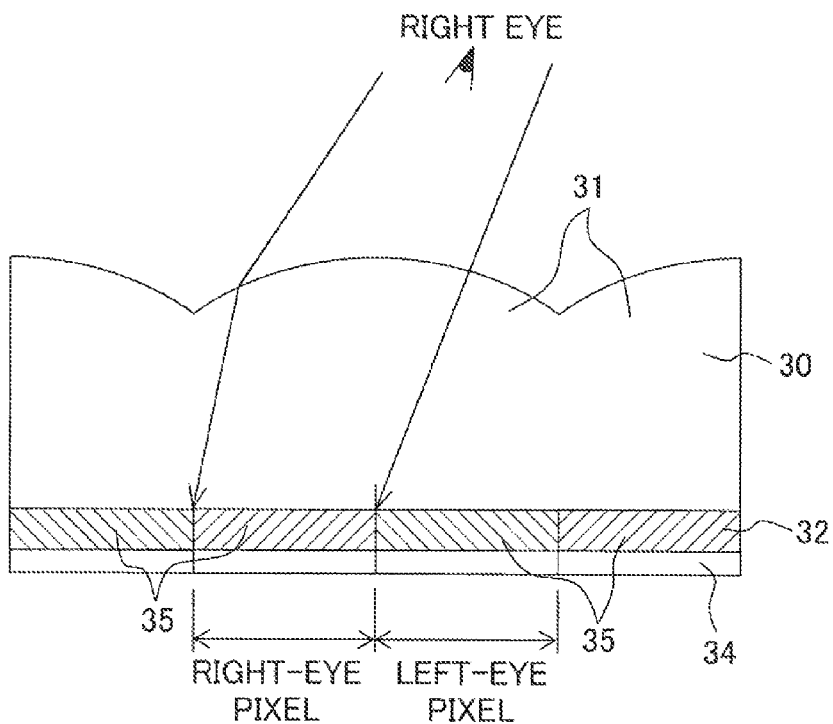

When, from the convex lens part 31 side of the lenticular lens 30, a person sees the lenticular sheet 100 in which the pixels (hatched portions) are formed on the pixel arrangement regions 35 of the first ink absorbing layer 32 respectively, a visual field of the left eye becomes as in FIG. 3A due to a photorefractive effect of the convex lens part 31, and the left eye visually perceives the left-eye pixels and does not visually perceive the right-eye pixels. On the other hand, a visual field of the right eye becomes as in FIG. 3B, and the right eye visually perceives the right-eye pixels and does not visually perceive the left-eye pixels. By the left eye and the right eye visually perceiving the left-eye pixels and the right-eye pixels which are slightly different pixels, respectively, a stereoscopic visual effect is produced.

Figure 4:
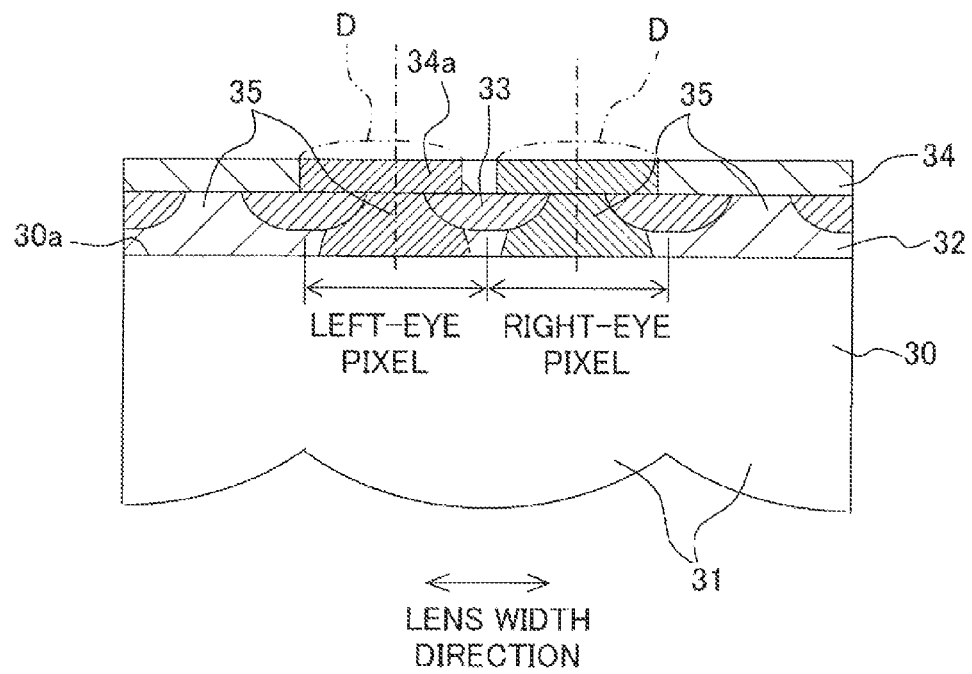
FIG. 4 is a cross-sectional view of the lenticular sheet.

As described above, on the first ink absorbing layer 32, the left-eye pixels and the right-eye pixels are formed to adjacent in the lens width direction. When the ink permeation occurs to/from the two left and right pixels, image quality greatly lowers, and a stereoscopic visual effect might not be produced. Therefore, as shown in FIG. 4, in the first ink absorbing layer 32, the suppressing part 33 suppressing the permeation of the ink to/from adjacent regions (pixel arrangement regions 35) is formed on a surface opposite the lenticular lens 30 (upper surface in the drawing), and consequently, the first ink absorbing layer 32 is divided into the pixel arrangement regions 35. Note that, in this embodiment, a liquid material low in ink permeability permeates into the first ink absorbing layer 32 from the surface, of the first ink absorbing layer 32, opposite the lenticular lens 30, thereby forming the suppressing part 33. In FIG. 4, the suppressing part 33 is disposed so as to cross a boundary between the left-eye pixel and the right-eye pixel of the pixel arrangement region 35 in the first ink absorbing layer 32. Consequently, it is possible at least to prevent the ink droplets from landing on the boundary portions between the left-eye pixels and the right-eye pixels of the first ink absorbing layer 32. Further, a shape of a cross section, of the suppressing part 33, perpendicular to the first ink absorbing layer 32 is substantially a semicircular shape, and its width gets narrower toward the lenticular lens 30 side. It should be noted that the cross-sectional shape of the suppressing part 33 is not limited to the substantially semicircular shape, and may be a tapered shape that gets narrower toward its end, for instance. The suppressing part 33 has such a thickness that it reaches a thickness-wise center portion of the first ink absorbing layer 32. Further, on the surface, of the first ink absorbing layer 32, on which the suppressing part 33 is formed, a second ink absorbing layer 34 is provided and the suppressing part 33 is covered by the second ink absorbing layer 34.

As described above, since the suppressing part 33 is formed between the pixel arrangement regions 35 of the first ink absorbing layer 32, the ink permeating in one pixel arrangement region 35 is prevented from permeating up to the adjacent pixel arrangement region 35 as shown in FIG. 4. Note that a material of the suppressing part 33 is not limited to a specific material, provided that it is lower in ink permeability than the first ink absorbing layer 32, and for example, it can be made of a resin material having very low ink permeability. Further, using fluorine-based resin such as PTFE excellent in ink repellency to form the suppressing part 33 makes it difficult for the ink to remain on the suppressing part 33 and makes it possible for the ink to quickly permeate in the pixel arrangement regions 35.

Further, as will be explained later, when the suppressing part 33 is made of a colored material, the suppressing part 33 formed between the pixel arrangement regions 35 can be used as detection target parts used when the pixel position detection sensor 26 (see FIG. 1) of the ink-jet printer 1 detects the positions and pitch of the pixel arrangement regions 35. The "colored" mentioned here indicates that the suppressing part 33 is not colorless and transparent, nor white. That is, the "colored" mentioned here refers to color that can be discriminated and detected when it is provided on the colorless and transparent first ink absorbing layer 32 or the while first ink absorbing layer 32. Incidentally, the first ink absorbing layer 32 does not necessarily have to be colorless and transparent, or white. In such a case as well, it is only necessary that the suppressing part 33 and the first ink absorbing layer 32 have different optical properties so that the suppressing part 33 can be discriminated from the first ink absorbing layer 32. For example, the suppressing part 33 may have different color or different color density from that of the first ink absorbing layer 32. An example of the resin material usable as the suppressing part 33 is UV ink. Concrete examples are photopolymerizable resin such as epoxy acrylate, a photopolymerization initiator such as a benzophane series, and UV ink having a dye or a pigment. Other examples are low-melting-point resin such as thermoplastic polymer and hot melt ink having a pigment or a dye. Incidentally, the resin material forming the suppressing part 33 may be one having ink repellency or may be one capable absorbing a small amount of ink into its layer. It is only necessary that the ink is not absorbed in the boundary regions of the pixel arrangement regions 35 on the lenticular lens 30 side of the first ink absorbing layer 32.

Further, as shown in FIG. 4, the cross-sectional shape of the suppressing part 33 is a shape becoming narrower toward its end, that is, its width gets narrower toward the lenticular lens 30 side (lower side in FIG. 4). Accordingly, a cross-sectional shape of the single pixel arrangement region 35 sandwiched by the suppressing part 33 has a shape fanning out downward on the contrary, and an area of its portion in which the ink permeates from the second adsorbing layer 34 (upper portion in FIG. 4), opposite the lenticular lens 30 becomes smaller. In other words, between the adjacent suppressing parts 33, the suppressing part 33 forms opening portions for having the ink pass therethrough at the lenticular lens 30 side (lower side in FIG. 4) of the first ink absorbing layer 32 and at an opposite side (upper side in FIG. 4). Since the suppressing part 33 has the cross-sectional shape that gets narrower toward the end, the opening portions on the opposite side of the lenticular lens 30 (upper side in FIG. 4), through which the ink enters the first ink absorbing layer 32, are narrower than the opening portions on the lenticular lens 30 side (lower side). Therefore, even if landing position of a droplet D to the second ink absorbing layer 34 deviates as in the landing of the droplet D to the left-eye pixel in FIG. 4 and an ink permeation region 34a in the second ink absorbing layer 34 slightly deviates from a center position of the pixel arrangement region 35, the position where the droplet D permeates in the first ink absorbing layer 32 does not change, which prevents the permeation of the ink into the adjacent pixel arrangement region 35.

Further, when the cross-sectional shape of the suppressing part 33 is the shape that gets narrower toward the end, as the ink permeates in a thickness direction of the first ink absorbing layer 32 in the single pixel arrangement region 35 sandwiched by the suppressing part 33, the ink spreads also in an in-plane direction while guided by a tapered surface of the suppressing part 33. This makes it possible for a pixel formed on the pixel arrangement region 35 to have a predetermined size or more while preventing the permeation of the ink to/from the adjacent pixel arrangement regions 35.

Note that, in FIG. 5, the vertical and lateral broken lines perpendicular to each other represent virtual boundary lines of the pixel arrangement regions 35, and each region surrounded by these broken lines represents the single pixel arrangement region 35. As shown in FIG. 5, the suppressing part 33 has a plurality of holes 33a corresponding to the pixel arrangement regions 35 respectively, and is formed to partially expose the respective pixel arrangement regions 35 and to surround their exposed portions 35a. Since the suppressing part 33 surrounds the exposed portion 35a of each of the pixel arrangement regions 35 (that is, the portion where the ink permeates from the second ink absorbing layer 34 to the first ink absorbing layer 32), the permeation of the ink to the adjacent pixel arrangement region 35 is surely prevented.

Further, as shown in FIG. 5, the holes 33a of the suppressing part 33 each may have a long hole shape which is elongated in the lens axial direction. The reason is as follows. Since the left-eye pixels and the right-eye pixels are arranged adjacently in the lens width direction, it is preferable that, in terms of the lens width direction, the holes 33a of the suppressing part 33 are small and a distance between the two holes 33a (width of the suppressing part 33) is large. On the other hand, since the left-eye pixels and the right-eye pixels are both arranged in rows in the lens axial direction, even the occurrence of slight running of the ink to/from the pixel arrangement regions 35 adjacent in the lens axial direction does not much affect image quality. Therefore, by increasing the length of the hole 33a of the suppressing part 33 in the lens axial direction, it is possible to increase an area of each of the holes 33a, that is, an area of each of the exposed portions 35a of the pixel arrangement regions 35, enabling an increase in a permeation speed of the ink in the single pixel arrangement region 35.

Incidentally, since the suppressing part 33 does not allow the easy permeation of the ink, the ink is likely to remain on the surface of the suppressing part 33. When the suppressing part 33 is exposed, the remaining ink is liable to contaminate the vicinity (hands of a user, the recording apparatus, and so on). Therefore, on the surface, of the first ink absorbing layer 32, opposite the lenticular lens 30, the second ink absorbing layer 34 is provided to cover the suppressing part 33. In this embodiment, the second ink absorbing layer 34, similarly to the first ink absorbing layer 32, is a colorless and transparent layer or a white layer excellent in ink absorbency. However, the second ink absorbing layer 34 does not necessarily have to be a colorless and transparent layer or a white layer and may be a colored layer, for instance. Having an aim to prevent the ink from remaining on the surface of the lenticular sheet 100, the second ink absorbing layer 34 need not have a very large thickness and may be smaller in thickness than the first ink absorbing layer 32. Forming the second ink absorbing layer 34 thinner than the first ink absorbing layer 32 makes it possible to reduce an amount of the ink absorbed by and staying in the second ink absorbing layer 34 without reaching the first ink absorbing layer 32 (an amount of the ink not contributing to image formation), which enables a larger volume of printing with one ink cartridge. Further, when the first ink absorbing layer 32 is white and the second ink absorbing layer 34 is transparent, it is possible to improve visibility of the suppressing part 33 on a rear surface of the first ink absorbing layer 32, even though the first ink absorbing layer 32 is a white sheet.

Next, an operation when an image is recorded (pixels are formed) on the lenticular sheet 100 by the ink-jet printer 1 will be explained.

First, in FIG. 1, the lenticular sheet 100 is set on the platen 2 so that its lenticular lens 30 becomes on the lower side and the lens width direction becomes parallel to the scanning direction of the carriage 3, and is transported in the lens axial direction by the transporting mechanism 5. Then, the ink-jet printer 1 jets droplets of the ink from the ink-jet head 4 to the lenticular sheet 100 while moving the carriage 3 in the scanning direction. At this time, the pixel position detection sensor 26 provided on the carriage 3 detects the colored suppressing part 33 located between the pixel arrangement regions 35, so that the scanning-direction position and the pitch of the pixel arrangement regions 35 are known. Then, based on the detection results of the pixel position detection sensor 26 and the scanning-direction position of the carriage 3 (ink-jet head 4) detected by the head position detection sensor 25, a jetting timing of the ink-jet head 4 is controlled, which makes it possible to land the droplets of the ink accurately on positions corresponding to the pixel arrangement regions 35 of the lenticular sheet 100 (second ink absorbing layer 34).

The droplets of the ink jetted from the ink-jet head 4 to the lenticular sheet 100 land on the surface of the second ink absorbing layer 34 and permeate from the second ink absorbing layer 34 to the pixel arrangement regions 35 of the first ink absorbing layer 32 to form pixels. Here, since the suppressing part 33 suppressing the permeation of the ink is provided between the pixel arrangement regions 35, the permeation of the ink to the adjacent pixel arrangement regions 35 is prevented by the suppressing part 33 even if the landing positions of the droplets on the second ink absorbing layer 34 slightly deviate.

Incidentally, when the landing position of the droplets on the second ink absorbing layer 34 deviates, the permeation region 34a of the ink in the second ink absorbing layer 34 deviates from the pixel arrangement region 35 of the first ink absorbing layer 32 as shown in FIG. 4, but since the second ink absorbing layer 34 is much apart in the thickness direction from the surface, of the first ink absorbing layer 32, in contact with the lenticular lens 30 (surface for the pixel formation perceived by the human eyes from the convex lens part 31 side), the deviation of the ink permeation region has little influence on image quality (stereoscopic image seen from the convex lens part 31 side).

Further, since the suppressing part 33 made of a material not allowing the easy permeation of the ink is covered by the second ink absorbing layer 34, the suppressing part 33 is not exposed to the surface of the lenticular sheet 100. Further, since the second ink absorbing layer 34 is far more excellent in ink absorbency than the suppressing part 33, the ink quickly permeates therein and the ink does not remain on its surface. Therefore, the ink does not remain on the surface of the lenticular sheet 100 after the image recording and the problem of the contamination of the vicinity does not occur.

Figure 6A:
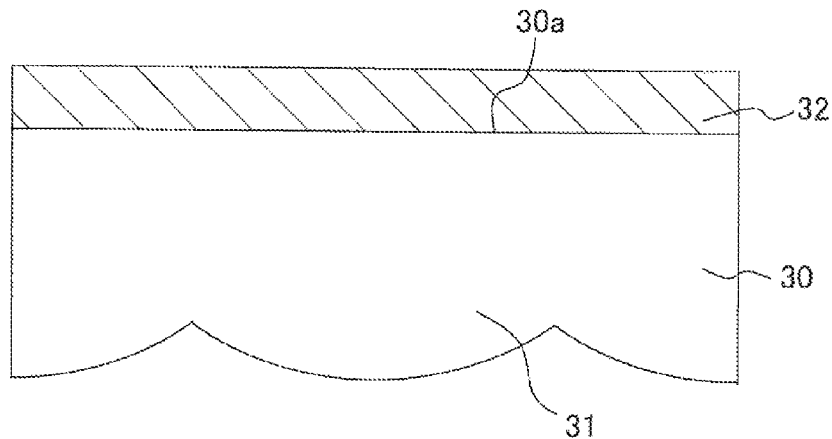
FIGS. 6A, 6B and 6C are views showing manufacturing processes of the lenticular sheet.

Next, a method for manufacturing the lenticular sheet 100 will be explained with reference to FIGS. 6A to 7. As shown in FIG. 6A, first, the lenticular lens 30 is prepared (S10 in FIG. 7) and the first ink absorbing layer 32 is stacked on the flat surface 30a, of the lenticular lens 30, opposite the convex lens parts 31 (first stacking step, S11 in FIG. 7). For example, a liquid or gelatinous resin material having ink absorbency is applied on the whole flat surface 30a of the lenticular lens 30, so that the first ink absorbing layer 32 can be formed. Alternatively, a paper sheet may be bonded on the flat surface 30a of the lenticular lens 30 by an adhesive. A thickness of the first ink absorbing layer 32 is 40 µm, for instance.

Figure 6B:
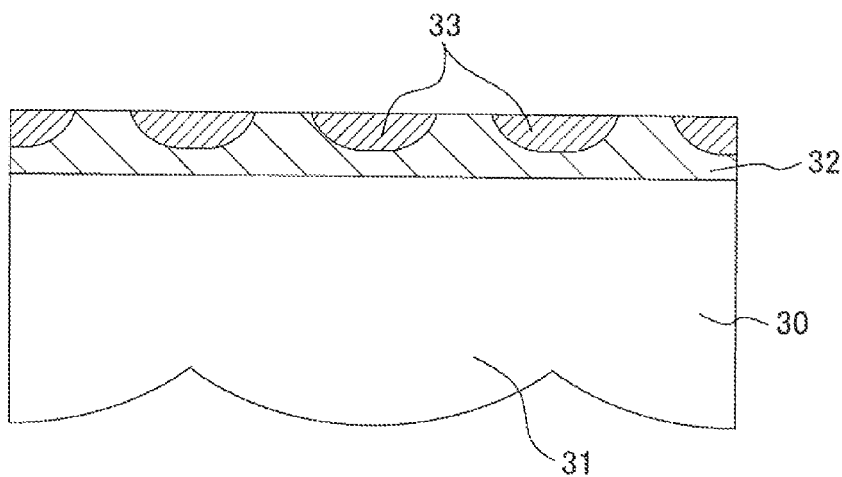
Figure 7:
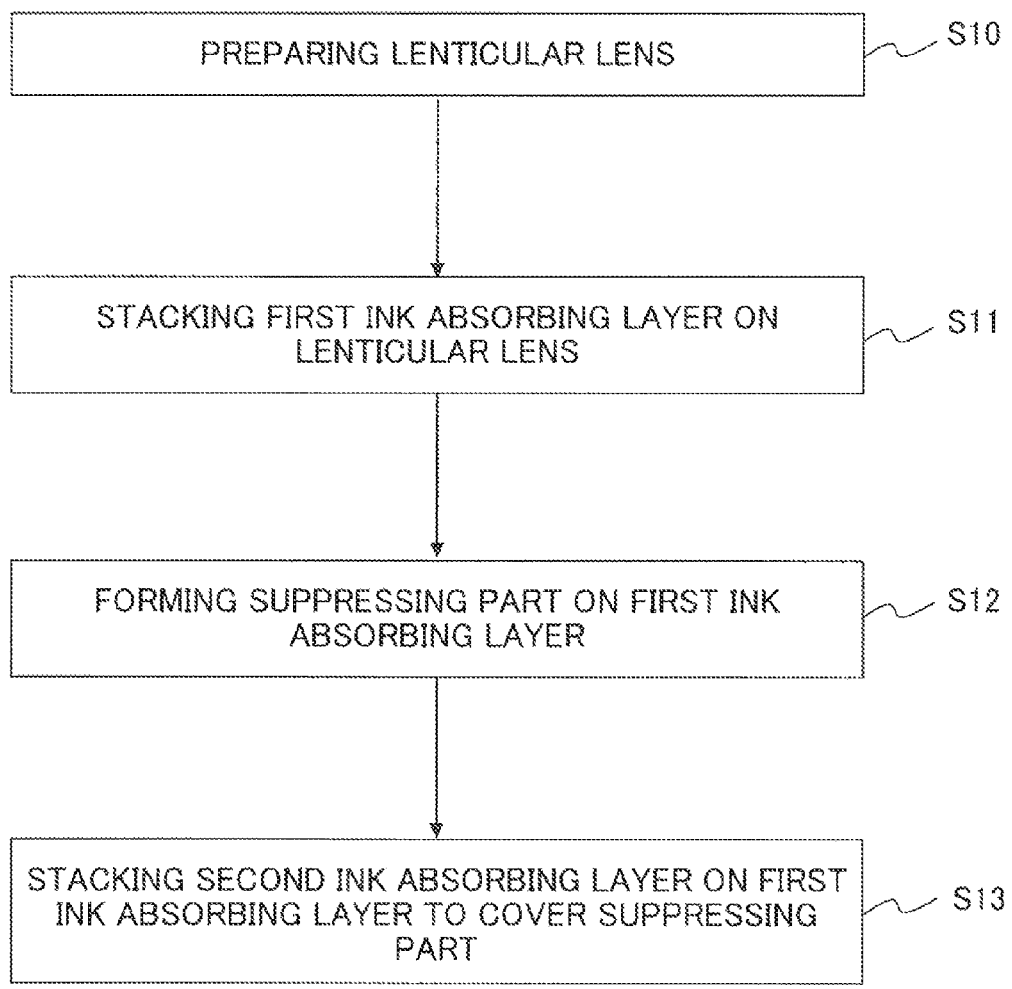
FIG. 7 is a flow chart showing manufacturing processes of the lenticular sheet.

Next, as shown in FIG. 6B, on the surface, of the first ink absorbing layer 32, opposite the lenticular lens 30, the suppressing part 33 is formed between the pixel arrangement regions 35 (suppressing layer forming step, S12 in FIG. 7). Here, a liquid material such as resin low in ink permeability is made to permeate in the first ink absorbing layer 32 from the surface, of the first ink absorbing layer 32, opposite the lenticular lens 30, whereby the suppressing part 33 is formed. Concretely, by using a droplet jetting apparatus, the liquid material for forming the suppressing part 33 is jetted from a nozzle of the droplet jetting apparatus and they are landed between the pixel arrangement regions 35 of the first ink absorbing layer 32 to permeate. A thickness of the suppressing part 33 is about 2 μm to about 5 μm, for instance. In this case, the material for forming the suppressing part 33 is preferably a liquid relatively low in surface tension and viscosity, such as, for example, UV ink or hot melt ink in order for the material to be easily jetted from the nozzle of the droplet jetting apparatus. In a method using the droplet jetting apparatus (so-called ink-jet method), it is possible to accurately land the material between the pixel arrangement regions 35 of the first ink absorbing layer 32. Further, when the landed droplets permeate in the first ink absorbing layer 32, a permeation amount becomes smaller and the width of the suppressing part 33 decreases as they go more apart from the landing position in the thickness direction. Accordingly, it is easy to form the suppressing part 33 having the cross-sectional shape getting narrower toward its end as shown in FIG. 4.

Figure 6C:
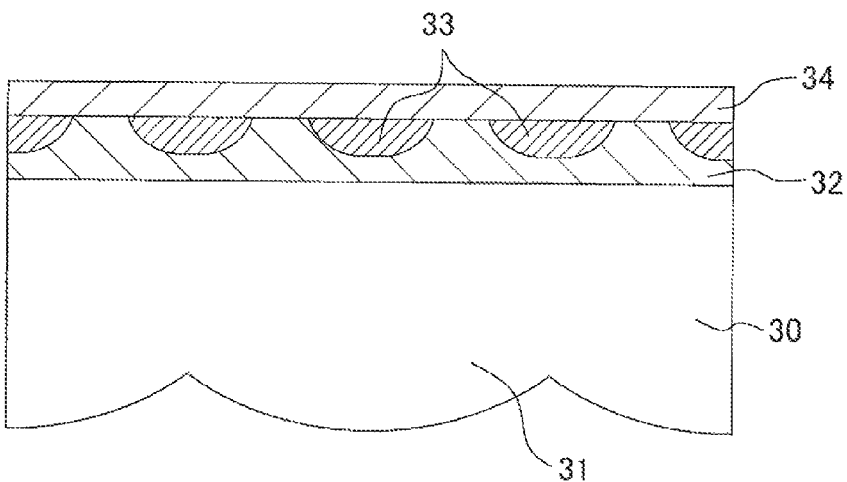

Thereafter, as shown in FIG. 6C, the second ink absorbing layer 34 is stacked on a surface opposite the lenticular lens 30, of the first ink absorbing layer 32 on which the suppressing part 33 is formed, so that the suppressing part 33 is covered by the second ink absorbing layer 34 (second stacking step, S13 in FIG. 7). Here, as in the first stacking step, a resin material excellent in ink absorbency is applied on the whole surface, of the first ink absorbing layer 32, opposite the lenticular lens 30. Alternatively, the second ink absorbing layer 34 can be formed by a method such as by bonding a paper sheet on the surface, of the first ink absorbing layer 32, opposite the lenticular lens 30.

Next, modified embodiments where various changes are made to the above-described embodiment will be explained. Those having the same structures as those of the above-described embodiments will be denoted by the same reference numerals and symbols and a description thereof will be omitted when appropriate.

First Modified Embodiment

Figure 8:
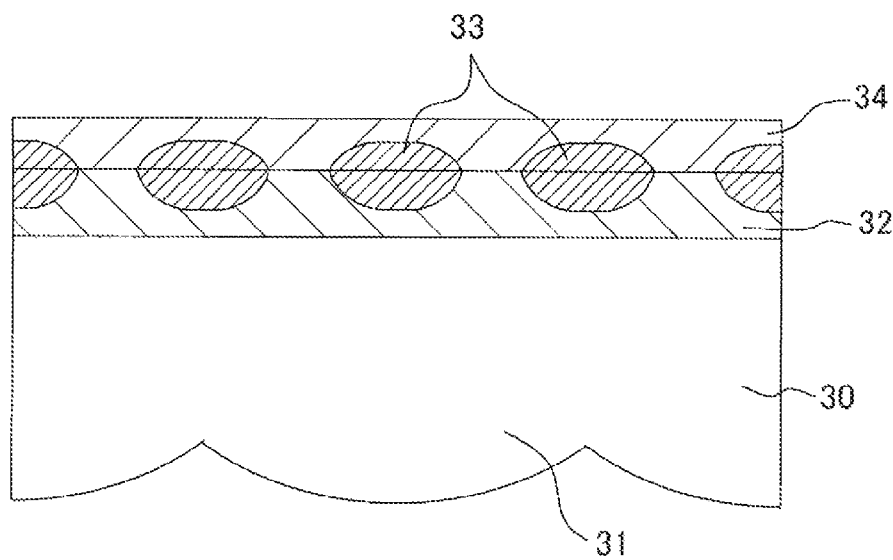
FIG. 8 is a cross-sectional view of a lenticular sheet of a first modified embodiment.

When a liquid material such as hot melt ink permeating in the first ink absorbing layer 32 is used as the suppressing part 33, it is also possible to make the liquid material permeate not only in the first ink absorbing layer 32 but also in the second ink absorbing layer 34 and bond the first ink absorbing layer 32 and the second ink absorbing layer 34 by the suppressing part 33, as shown in FIG. 8. This is effective especially when the first ink absorbing layer 32 and the second ink absorbing layer 34 are each made of a sheet material such as paper.

The lenticular sheet 100 in FIG. 8 can be manufactured as follows, for instance. After the first ink absorbing layer 32 in a sheet form is bonded on the lenticular lens 30 by an adhesive, the liquid hot melt ink heated to a predetermined melting temperature or higher is dropped between the pixel arrangement regions 35 of the first ink absorbing layer 32 to form the suppressing part 33. Here, in the liquid form, the hot melt ink permeates in the first ink absorbing layer 32, but on the way of the permeation, the hot melt ink is solidified by cooling and its permeation is temporarily stopped. Even when the hot melt ink has a high temperature when it is dropped, it is naturally cooled when dropped to the first ink absorbing layer 32 having a lower temperature, and therefore, even without going through a cooling step, it can be cooled and solidified on the way of the permeation.

Next, on the surface of the first ink absorbing layer 32 on which the hot melt ink is solidified, the second ink absorbing layer 34 in a sheet form is placed, and thereafter, the whole structure is heated to the melting temperature of the hot melt ink or higher. Consequently, the hot melt ink melts again, and its portion not having permeated in the first ink absorbing layer 32 permeates in the second ink absorbing layer 34, so that the first ink absorbing layer 32 and the second ink absorbing layer 34 are bonded by the hot melt ink.

Second Modified Embodiment

Figure 9:
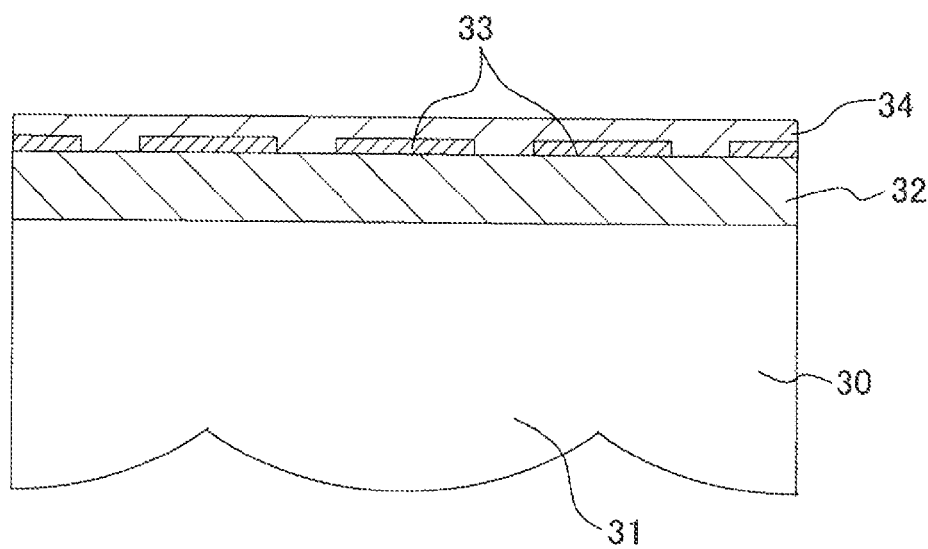
FIG. 9 is a cross-sectional view of a lenticular sheet of a second modified embodiment.

In the above-described embodiment, the liquid material forming the suppressing part 33 permeates from the surface opposite the lenticular lens 30 up to the inside of the first ink absorbing layer 32, but the suppressing part 33 may be formed to be placed on the surface, of the first ink absorbing layer 32, opposite the lenticular lens 30 as shown in FIG. 9. The suppressing part 30 of this embodiment can be formed in such a manner that a material low in ink permeability is patterned on the surface, of the first ink absorbing layer 32, opposite the lenticular lens 30 by using a mask. Alternatively, after the suppressing part 33 is applied on the whole surface of the first ink absorbing layer 32, part thereof may be removed by laser processing so that the first ink absorbing layer 32 is exposed.

Third Modified Embodiment

Figure 10:
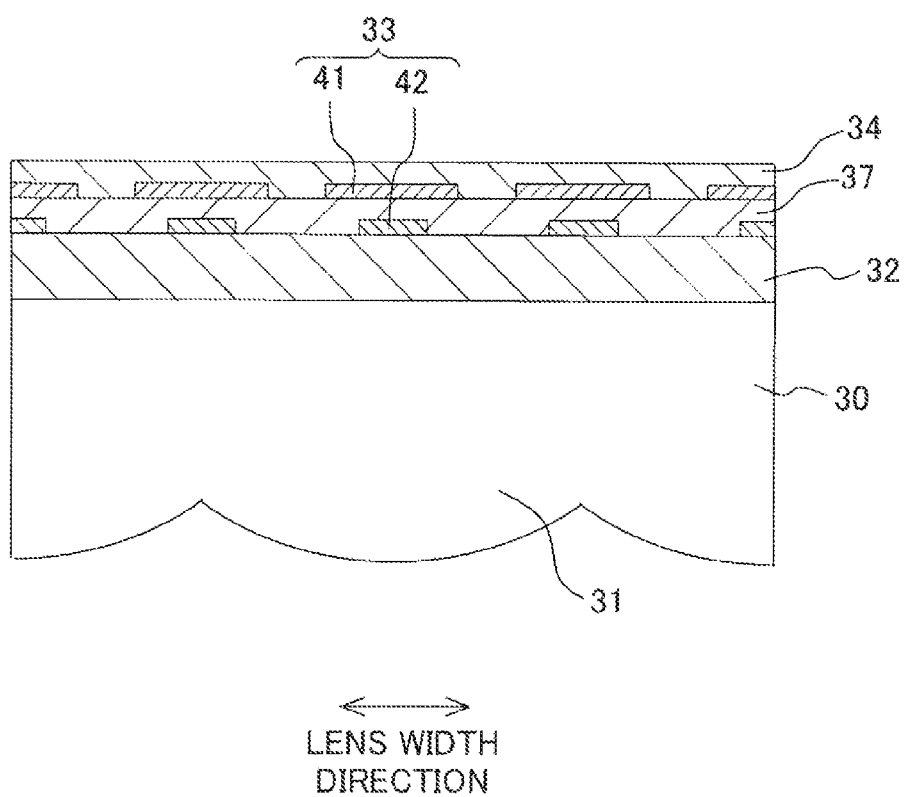
FIG. 10 is a cross-sectional view of a lenticular sheet of a third modification embodiment.

In the form where the suppressing part 33 is not made to permeate in the first ink absorbing layer 32 as in FIG. 9, the cross-sectional shape of the suppressing part 33 is also preferably a shape whose width gets narrower toward the lenticular lens 30 side. For example, the structure shown in FIG. 10 is also adoptable in which a first suppressing part 40 is formed on the surface, of the first ink absorbing layer 32, opposite the lenticular lens 30, an ink absorbing layer 37 is provided to cover the first suppressing part 40, and thereon, a second suppressing part 41 larger in width than the first suppressing part 40 is provided. In this case, in the course where the ink permeates from the second ink absorbing layer 34 to the pixel arrangement regions 35 of the first ink absorbing layer 32, the ink, when in the ink absorbing layer 37 located between the two ink absorbing layers 32, 34, permeates so as to permeate in the thickness direction and also spreads in an in-surface direction while guided by the second suppressing part 41 and the first suppressing part 40 smaller in width than the second suppressing part 41.

Fourth Modified Embodiment

Figure 11:
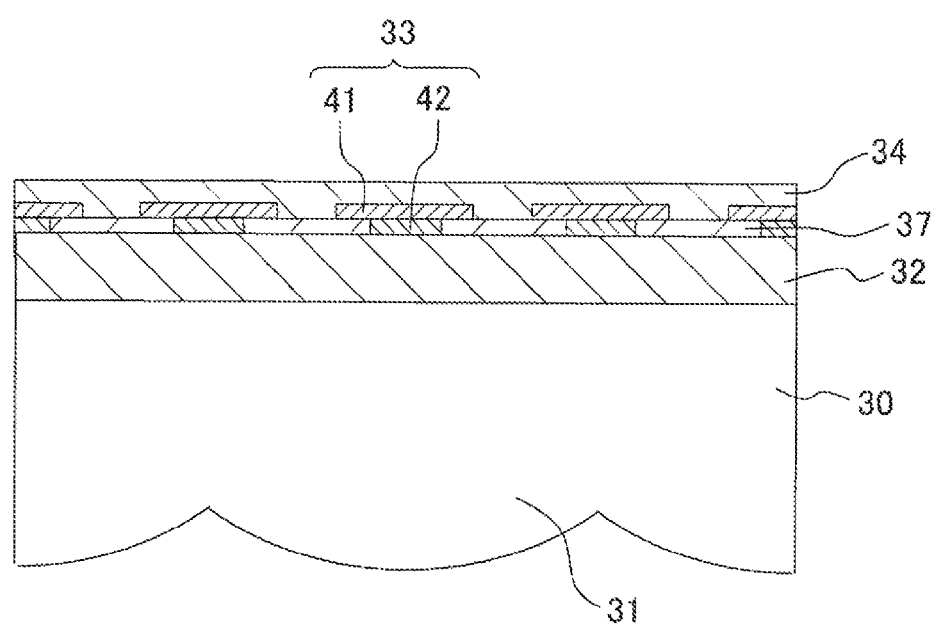
FIG. 11 is a cross-sectional view of a lenticular sheet of a fourth modified embodiment.

As shown in FIG. 11, the second suppressing part 41 may be provided to be in contact with the first suppressing part 40. In this case as well, it is possible for the ink to permeate so as to permeate in the thickness direction and at the same time spread in the in-plane direction while guided by the second suppressing part 41 and the first suppressing part 40 smaller in width than the second suppressing part 41, as in the embodiment in FIG. 10.

Fifth Modified Embodiment

Figure 12:
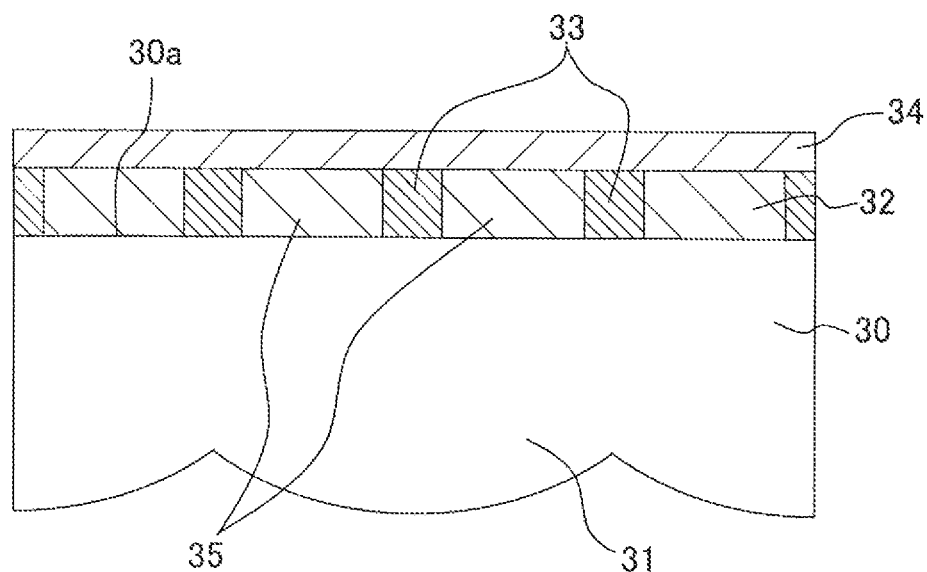
FIG. 12 is a cross-sectional view of a lenticular sheet of a fifth modified embodiment.

As shown in FIG. 12, the suppressing part 33 may be provided between the pixel arrangement regions 35 of the first ink absorbing layer 32 to completely separate the adjacent pixel arrangement regions 35. In this embodiment, the suppressing part 33 may be made of a resin material or the like low in ink permeability as in the above-described embodiment, but since the lenticular lens 30 itself is made of a material not allowing the permeation of the ink, the suppressing part 33 may be integrally formed with the lenticular lens 30, by using the same material as that of the lenticular lens 30. That is, the suppressing part 33 may be formed to separate the pixel arrangement regions 35 of the first ink absorbing layer 32 by protruding from the flat surface 30a of the lenticular lens 30 to a side opposite the convex lens parts 31.

Sixth Modified Embodiment

Figure 13:
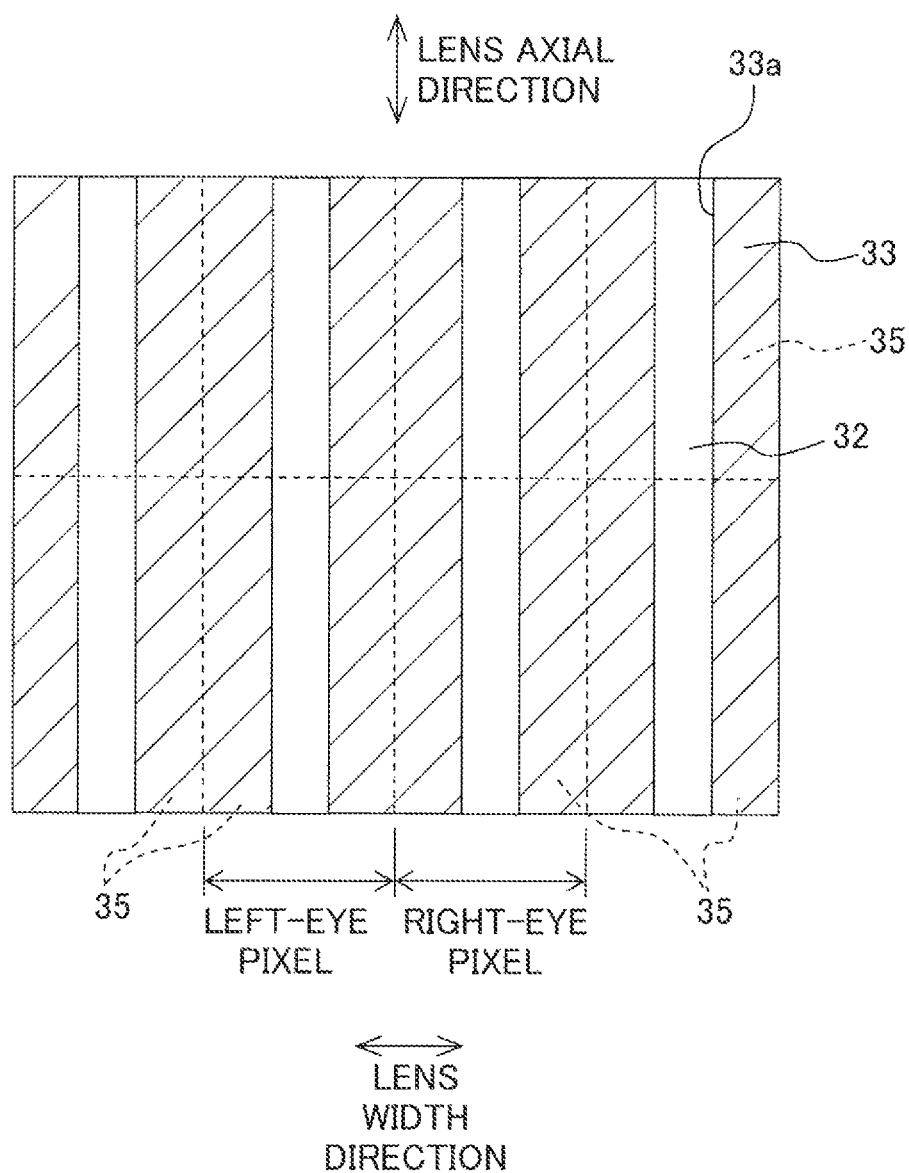
FIG. 13 is a plane view of a first ink absorbing layer on which a suppressing part is formed, in a lenticular sheet of a sixth modified embodiment.

In FIG. 5, the holes 33a corresponding to the respective pixel arrangement regions 35 are formed in the suppressing part 33, so that the exposed portion of the single pixel arrangement region 35 is surrounded by the suppressing part 33. However, as previously described, in the lens axial direction, the left-eye pixels and the right-eye pixels are both arranged in rows and the permeation of the ink to/from the pixel arrangement regions 35 adjacent in the axial direction does not cause any significant problem. Therefore, as shown in FIG. 13, band-shaped holes 33a each corresponding to each row of the pixel arrangement regions 35 arranged in the lens axial direction may be formed in the suppressing part 33 so that the pixel arrangement regions 35 adjacent in the lens axial direction are connected to each other without being separated by the suppressing part 33.

Seventh Modified Embodiment

As the lenticular lens, not only that having the convex lens parts 31 in the substantially semi-columnar shape in the above-described embodiment but also one in which a plurality of convex lens parts in a semispherical shape are two-dimensionally arranged is known, and the present teaching is also applicable to a lenticular sheet having such a lens.

What is claimed is:

1. A lenticular sheet comprising:
a lenticular lens having a plurality of convex lens parts arranged two-dimensionally;
a first ink absorbing layer which is provided on a surface, of the lenticular lens, opposite the convex lens parts and in which ink permeates;
a plurality of suppressing parts provided on the first ink absorbing layer to divide the first ink absorbing layer into a plurality of regions, each of the plurality of suppressing parts suppressing the ink from permeating across the plurality of the regions; and
a second ink absorbing layer provided to cover the suppressing parts;
wherein the suppressing parts are configured to suppress a movement of the ink in an absorbing direction along which the ink is moved and absorbed toward the convex lens parts of the lenticular lens; and
wherein the suppressing parts are arranged on the first absorbing layer so that the ink moves through one of the regions of the first ink absorbing layer located between two adjacent suppressing parts of the suppressing parts.

2. The lenticular sheet according to claim 1;
wherein the suppressing parts are provided, on a surface of the first ink absorbing layer, opposite the lenticular lens, at areas between the plurality of the regions.

3. The lenticular sheet according to claim 1;
wherein each of the suppressing parts is disposed between the plurality of the regions of the first ink absorbing layer and is provided so that the adjacent regions are separated by one of the suppressing parts.

4. The lenticular sheet according to claim 1;
wherein the suppressing parts have, in a cross section perpendicular to the first ink absorbing layer, a shape becoming narrower in width along a direction from the first ink absorbing layer toward the convex lens parts of the lenticular lens.

5. The lenticular sheet according to claim 1;
wherein the suppressing parts are made of a colored material.

6. The lenticular sheet according to claim 1;
wherein the suppressing parts are made of a material different in color or color density from the first ink absorbing layer.

7. The lenticular sheet according to claim 1;
wherein the convex lens parts of the lenticular lens each have a semi-columnar shape and the plurality of the convex lens parts axe arranged in a width direction;
wherein the suppressing parts have a plurality of holes corresponding to the plurality of the regions respectively, and is formed to partially expose each of the plurality of the regions and to surround exposed portions; and
wherein the plurality of the holes of the suppressing parts are formed to have a long hole shape that is elongated in an axial direction of the convex lens parts in the semi-columnar shape.

8. The lenticular sheet according to claim 1;
wherein the suppressing parts are located on the first ink absorbing layer so that the suppressing parts step over a line which is substantially parallel to the absorbing direction and which passes through a tip portion of one of the convex lens parts of the lenticular lens.

9. A method for manufacturing a lenticular sheet comprising:
preparing a lenticular lens having a plurality of convex lens parts arranged two-dimensionally;
stacking a first ink absorbing layer on a surface, of the lenticular lens, opposite the convex lens parts;
disposing, on the first ink absorbing layer, a plurality of suppressing parts suppressing the permeation of ink, to divide the first ink absorbing layer into a plurality of regions; and
stacking a second ink absorbing layer on a surface opposite the lenticular lens, of the first ink absorbing layer on which the suppressing part is formed;
wherein the suppressing parts are configured to suppress a movement of the ink in an absorbing direction along which the ink is moved and absorbed toward the convex lens parts of the lenticular lens; and
wherein the suppressing parts are arranged on the first absorbing layer so that the ink moves through one of the regions of the first ink absorbing layer located between two adjacent suppressing parts of the suppressing parts.

10. The method of manufacturing the lenticular sheet according to claim 9;
wherein, in disposing the suppressing parts, a liquid material that is to form the suppressing part is landed between the plurality of the regions of the first ink absorbing layer by using a droplet jetting apparatus to form the suppressing parts.

* * * * *